(12) United States Patent
Wendlandt et al.

(10) Patent No.: US 6,571,952 B2
(45) Date of Patent: Jun. 3, 2003

(54) STORAGE PHOSPHOR CASSETTE HAVING A CORNER ELEMENT

(75) Inventors: William C. Wendlandt, Rush, NY (US); Daniel N. Peek, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 19 days.

(21) Appl. No.: 09/896,735

(22) Filed: Jun. 29, 2001

(65) Prior Publication Data
US 2003/0000861 A1 Jan. 2, 2003

(51) Int. Cl.[7] .............................................. B65D 85/48
(52) U.S. Cl. ........................ 206/455; 206/453; 206/586
(58) Field of Search .................................. 206/453, 455, 206/586; 248/188.9, 345.1; 190/37; 16/18

(56) References Cited

U.S. PATENT DOCUMENTS

| | | | |
|---|---|---|---|
| 4,618,062 A | * 10/1986 | Tomidokoro | 206/455 |
| 4,697,902 A | 10/1987 | Maehara et al. | |
| 5,026,588 A | * 6/1991 | Diekmann | 428/100 |
| 5,101,423 A | 3/1992 | Okamoto et al. | 378/182 |
| 5,310,059 A | * 5/1994 | Robertson | 206/455 |
| 5,861,631 A | 1/1999 | Wendlandt et al. | 250/484.4 |
| 5,869,839 A | 2/1999 | Wendlandt et al. | 250/484.4 |
| 5,943,390 A | 8/1999 | Wendlandt et al. | 378/189 |
| 6,103,335 A | * 8/2000 | Zoller et al. | 428/116 |

FOREIGN PATENT DOCUMENTS

| | | | |
|---|---|---|---|
| DE | 3701293 | * | 4/1988 |
| EP | 0 075 785 a2 | | 4/1983 |

OTHER PUBLICATIONS

Patent Abstract, Japanese Patent Publication No. 61192638, Publication Date Aug. 27, 1986, application Date Feb. 20, 1985, Application No. 60033086, Applicant: Fuji Photo Film Co. LTD, Inventor: Watanabe Kazuya.

Patent Abstract, Japanese Patent Publication No. 07036130, Publication Date: Feb. 7, 1995, Application Date Jul. 16, 1993, Application No. 05176947, Applicant: Fuji Photo Film Co. Ltd, Inventor: Ota Yasuyoshi.

* cited by examiner

Primary Examiner—David T. Fidei
(74) Attorney, Agent, or Firm—Susan L. Parulski

(57) ABSTRACT

A corner element for an x-ray cassette for providing increased durability and light integrity. The x-ray cassette includes an upper and lower panel, a first member joining the upper and lower panels to define a cavity therebetween, and a storage phosphor assembly adapted to be removably contained within the cavity. The corner element comprises an upper and lower corner channel for receiving, respectively, the upper and lower panels; and a first leg adapted to mate with the first member and having an inclined element integrally formed therewith, the storage phosphor assembly being disposed adjacent to the inclined element when contained within the cavity.

20 Claims, 8 Drawing Sheets

STORAGE PHOSPHOR CASSETTE HAVING A CORNER ELEMENT

CROSS REFERENCE TO RELATED APPLICATION

Reference is made to pending commonly assigned application U.S. Ser. No. 09/896,625 entitled "STORAGE PHOSPHOR CASSETTE", filed on Jun. 29, 2001 in the names of Wendlandt et al., and which is assigned to the assignee of this application.

Reference is made to pending commonly assigned application U.S. Ser. No. 09/923,186 entitled "STORAGE PHOSPHOR CASSETTE", filed on Aug. 6, 2001 in the names of Wendlandt et al., assigned to the assignee of this application, which is a continuation-in-part of U.S. Ser. No. 09/896,697 entitled "STORAGE PHOSPHOR CASSETTE", filed on Jun. 29, 2001 in the names of Wendlandt et al., which is assigned to the assignee of this application.

FIELD OF THE INVENTION

The present invention relates generally to cassettes for photographic elements, and more particularly, to an x-ray cassette used in computed radiography.

BACKGROUND OF THE INVENTION

In the field of computed radiography, a photographic element has an image formed thereon by x-rays. The photographic element is subsequently provided to a reader wherein the element is stimulated to emit a radiation pattern that is indicative of the image formed by the x-rays. Typically, storage phosphors are used to capture radiographic images from incident x-rays. Most radiographic procedures are carried out within normal room lighting conditions, accordingly, a primary requirement for any computed radiography x-ray cassette is to shield the storage phosphor from exposure by ambient light.

Cassettes of the kind used in computed radiography may comprise a container having an upper and lower parts that are hinged together so that they can be opened for insertion of a flexible film sheet or a rigid film plate comprising the photographic element. The cassette is closed and latched so that the cassette with the element therein can be used with an x-ray apparatus to produce an image on the photographic element. Then, the cassette is taken to a reader where the cassette is opened and the photographic element extracted by suitable feeders, such as a suction feeding device. The photographic element separates from the cassette, and is transported through the reader where it is stimulated to emit a radiation pattern which is captured for storage and use. The radiation pattern is subsequently erased from the photographic element before being returned to the cassette for re-use.

U.S. Pat. Nos. 5,861,631, 5,869,839, and 5,943,390 commonly assigned and incorporated herein by reference, disclose cassettes of the kind used in computed radiography.

While such cassettes may have achieved certain degrees of success in their particular applications, cassettes are susceptible to various types of damage when dropped or roughly handled. Accordingly, it is desirable to increase the durability of the cassette while minimizing cost and weight, and preserving the same basic nature of design.

Accordingly, a need continues to exist for a cassette which is durable and is not susceptible to damage when dropped or roughly handled, improves light integrity, yet cost and weight is minimized, and the same basic nature of design is preserved.

SUMMARY OF THE INVENTION

An object of the present invention is to provide a cassette which has increased durability, and is resistant to damage when dropped or roughly handled.

Still another object of the invention is to provide such a cassette which provides light integrity by shielding the storage phosphor from exposure by ambient light, particularly when dropped, roughly handled, and/or damaged.

These objects are given only by way of illustrative example. Thus, other desirable objectives and advantages inherently achieved by the disclosed invention may occur or become apparent to those skilled in the art. The invention is defined by the appended claims.

According to one aspect of the invention, there is provided a corner element for an x-ray cassette having an upper and lower panel, a first member joining the upper and lower panels to define a cavity therebetween, and a storage phosphor assembly adapted to be removably contained within the cavity. The corner element comprises an upper and lower corner channel for receiving, respectively, the upper and lower panels; and a first leg adapted to mate with the first member and having an inclined element integrally formed therewith, the storage phosphor assembly being disposed adjacent to the inclined element when contained within the cavity.

According to another aspect of the invention, there is provided an x-ray cassette. The x-ray cassette includes a shell comprising an upper and lower panel, a first and second side member, and a front end member, the first and second side members and front end member joining the upper and lower panels to define a cavity; a storage phosphor assembly adapted to be removably contained within the cavity; and a corner element. The corner element comprises (a) an upper and lower corner channel for receiving, respectively, the upper and lower panels, the upper corner channel being parallel to the lower corner channels; (b) a first leg adapted to mate with the first or second side member, the first leg having an inclined element integrally formed therewith which is disposed adjacent to the storage phosphor assembly when the storage phosphor assembly is contained within the cavity, the inclined element forming an acute angle relative to the first leg; and (c) a second leg adapted to mate with the front end member of the x-ray cassette, the second leg being perpendicular to the first leg.

The present invention provides a cassette which has increased durability and which shields the storage phosphor from exposure by ambient light.

BRIEF DESCRIPTION OF THE DRAWINGS

The foregoing and other objects, features, and advantages of the invention will be apparent from the following more particular description of the preferred embodiments of the invention, as illustrated in the accompanying drawings.

DETAILED DESCRIPTION OF THE INVENTION

Figure 1:
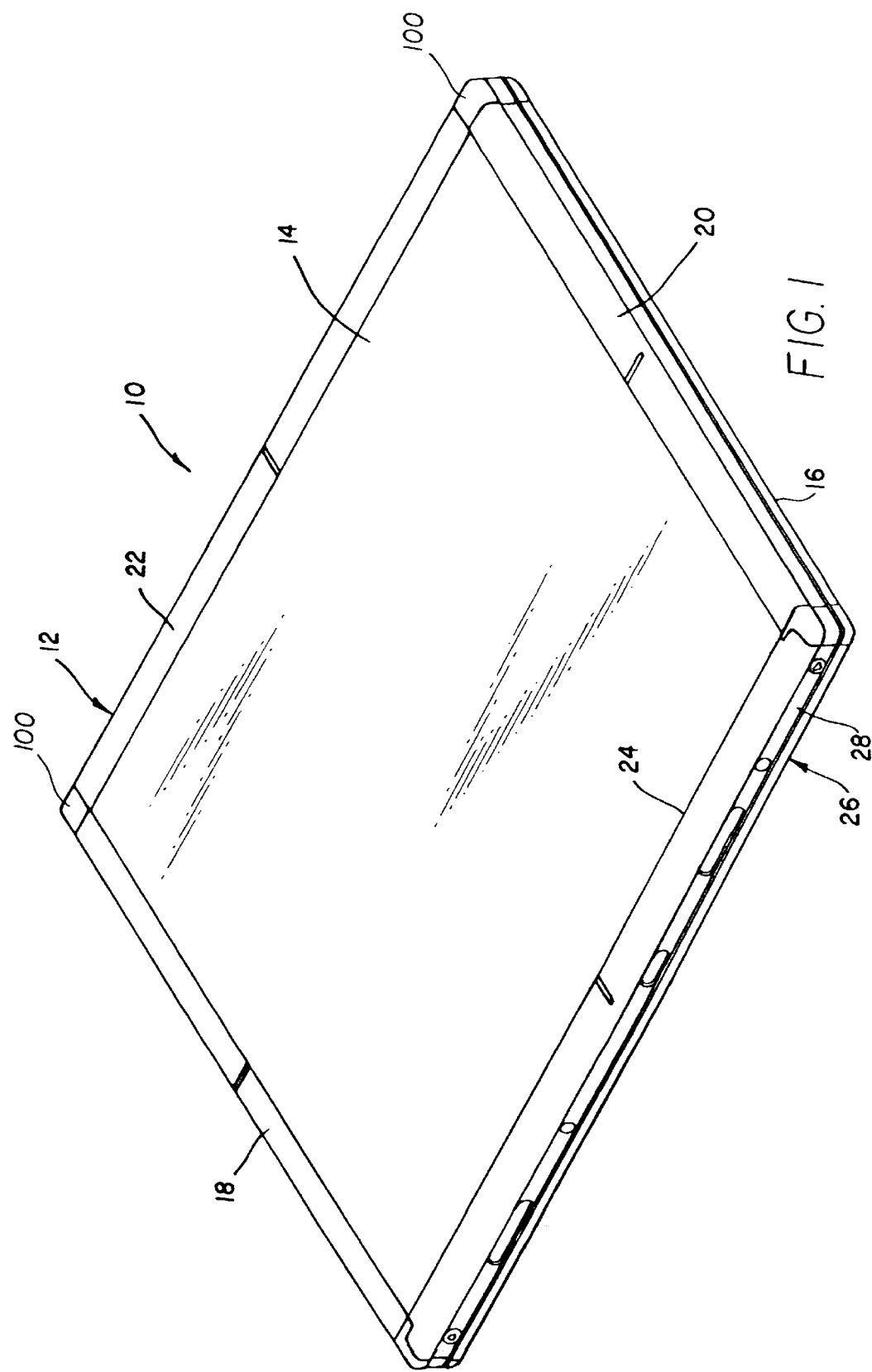
FIG. 1 shows a perspective view of a storage phosphor cassette in accordance with the present invention.

The following is a detailed description of the preferred embodiments of the invention, reference being made to the drawings in which the same reference numerals identify the same elements of structure in each of the several figures.

Figure 2:
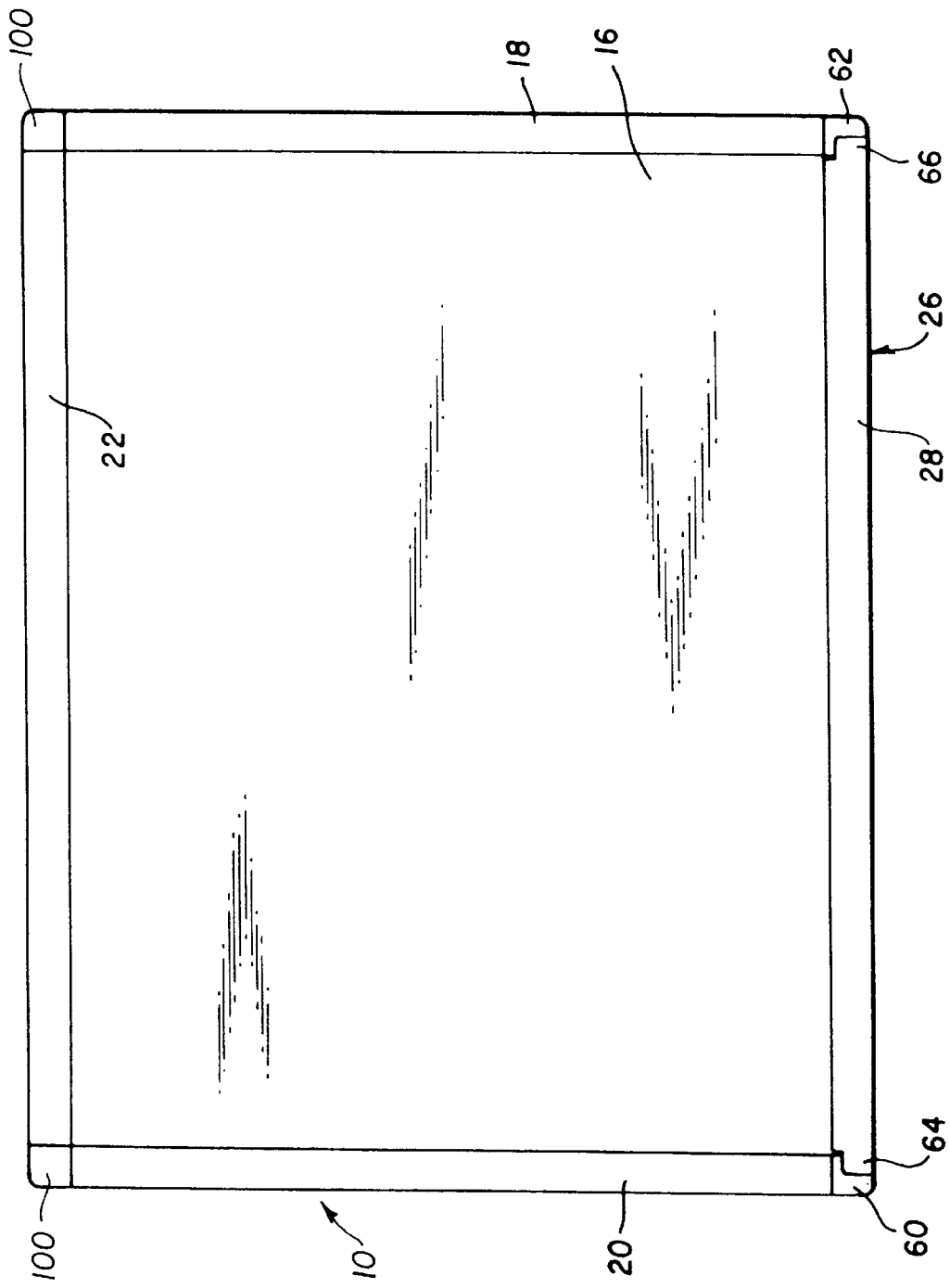
FIG. 2 shows a bottom view of the cassette of FIG. 1.
Figure 3:
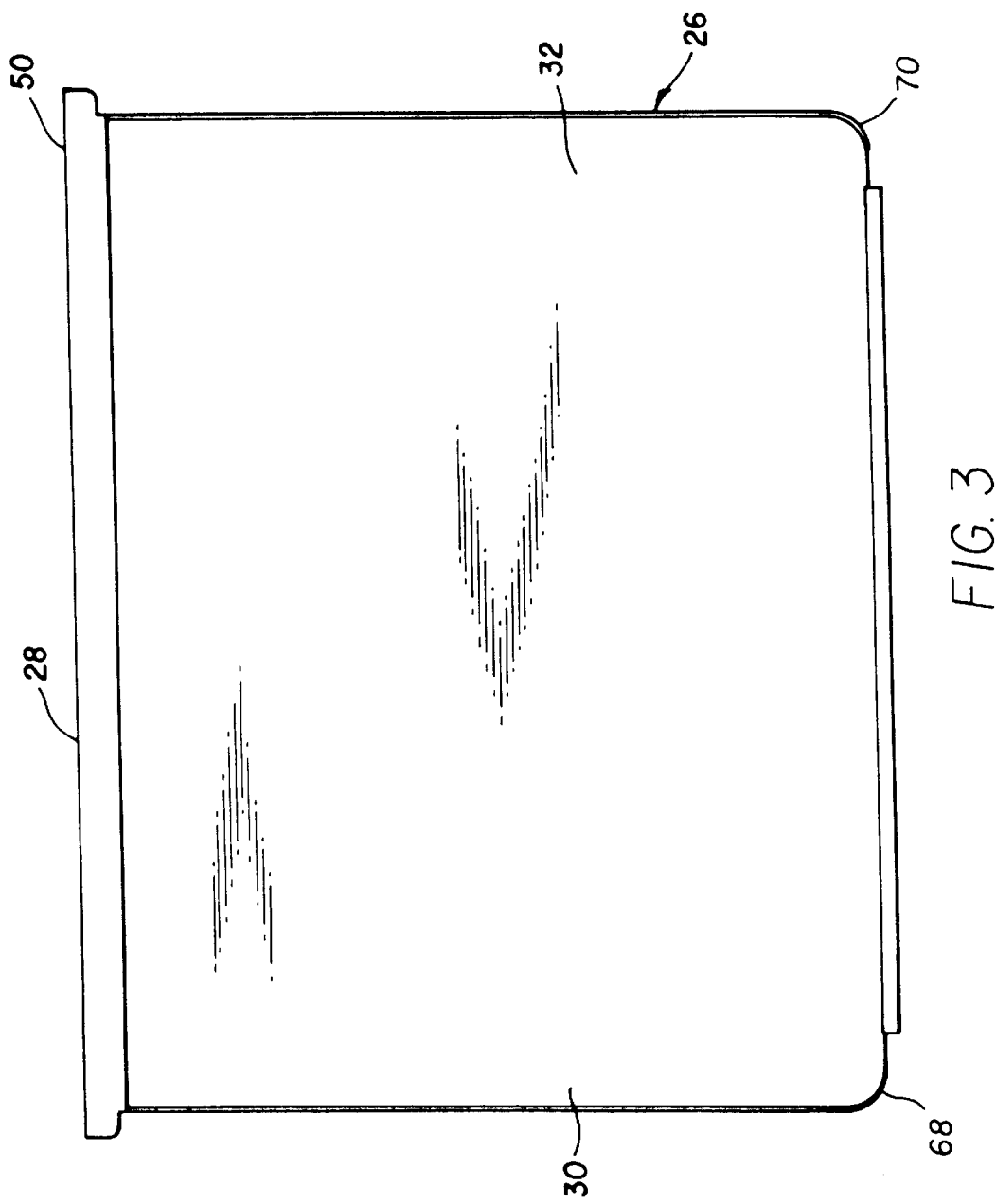
FIG. 3 shows a top view of the storage phosphor assembly of the cassette of FIG. 1.

FIGS. 1–3 show a storage phosphor cassette 10 in accordance with the present invention. Cassette 10 includes a shell 12 comprising an upper panel 14, a lower panel 16, a first side member 18, a second side member 20, and a front end member 22. Upper and lower panels 14,16 are preferably rectangular in shape. First side member 18, second side member 20, and front end member 22 join upper and lower panels 14,16 to form a five-sided cavity having an open end 24.

Cassette 10 further includes a storage phosphor assembly 26 having a back end member 28, an insert plate 30 having an upper face, and a storage phosphor 32 disposed on the upper face of insert plate 30. The front end of insert plate 30 includes corners 68,70, which are preferably rounded.

Storage phosphor assembly 26 is removably contained within the cavity of shell 12 such that back end member 28 of storage phosphor assembly 26 closes off open end 24 of shell 12, thereby providing a light-tight enclosure for storage phosphor 32.

Back end member 28 of storage phosphor assembly 26 includes end portions 64,66. First and second side members 18,20 include a corner structure 60,62, respectively, which respectively engage end portions 64,66. Corner structures 60,62 can be integral with first and second side members 18,20, or as illustrated, can be separate corner pieces which are secured to first and second side members 18,20. End portions 64,66 and respective corner structures 60,62 have complimentary, interlocking configurations, such that, should cassette 10 be dropped and a force exerted on either corner structure 60,62, the force is transferred to storage phosphor assembly 26, forcing assembly 26 into shell 12.

To join first side member 18, second side member 20, and front end member 22 with upper and lower panels 14,16, at least one corner element 100 is employed. As illustrated in FIGS. 1 and 2, two corner elements 100 are employed, one at each end of front end member 22, to form two corners of cassette 10. Corner element 100 is more particularly shown in FIGS. 4–8. Corner element 100 includes a corner portion 101, an upper corner channel 102, a lower corner channel 104, a first leg 105, an inclined element 106, and a second leg 107.

Corner portion 101 forms a corner section of cassette 10.

Figure 4:
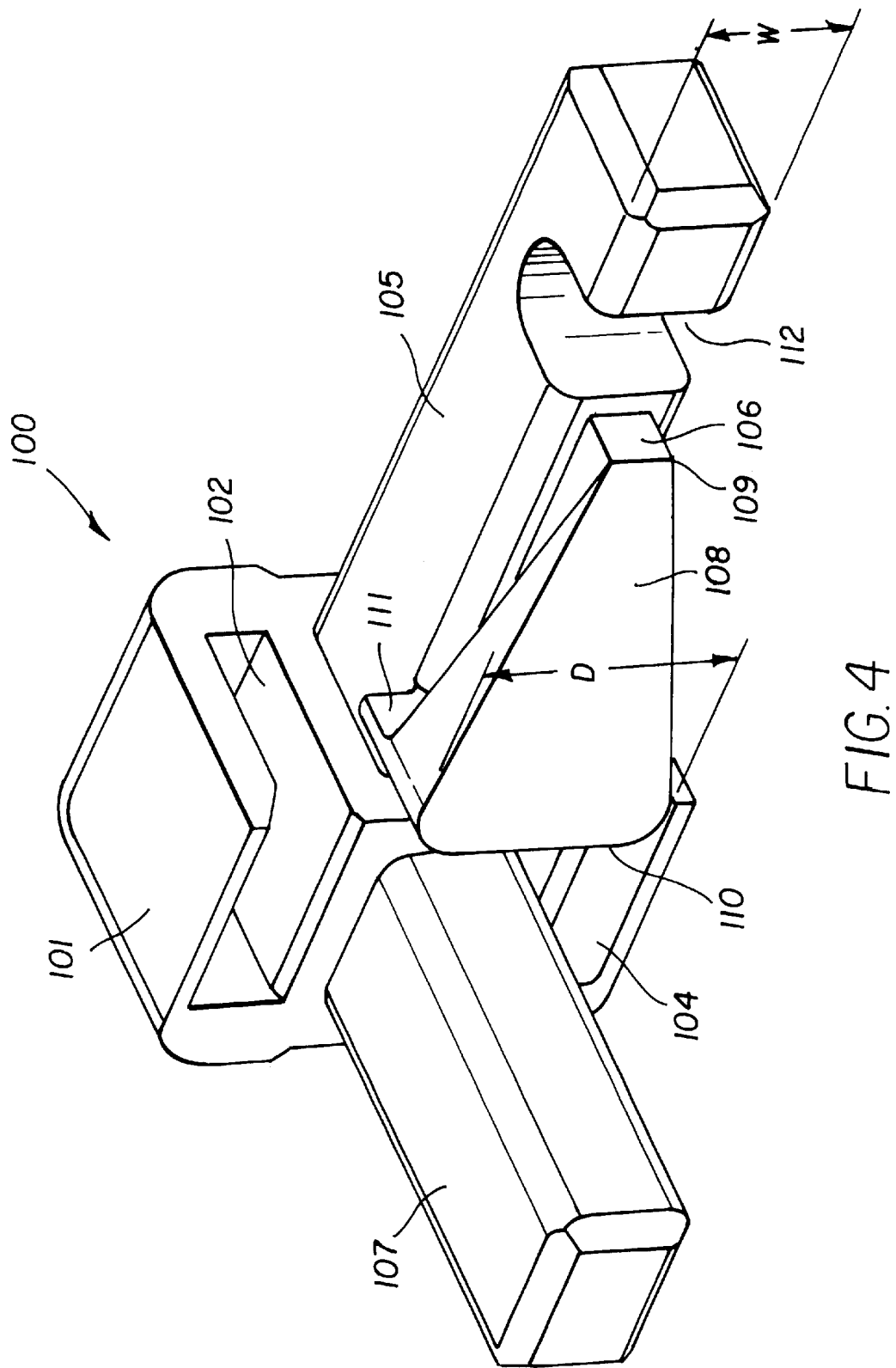
FIG. 4 shows a perspective view of an corner element in accordance with the present invention.
Figure 5:
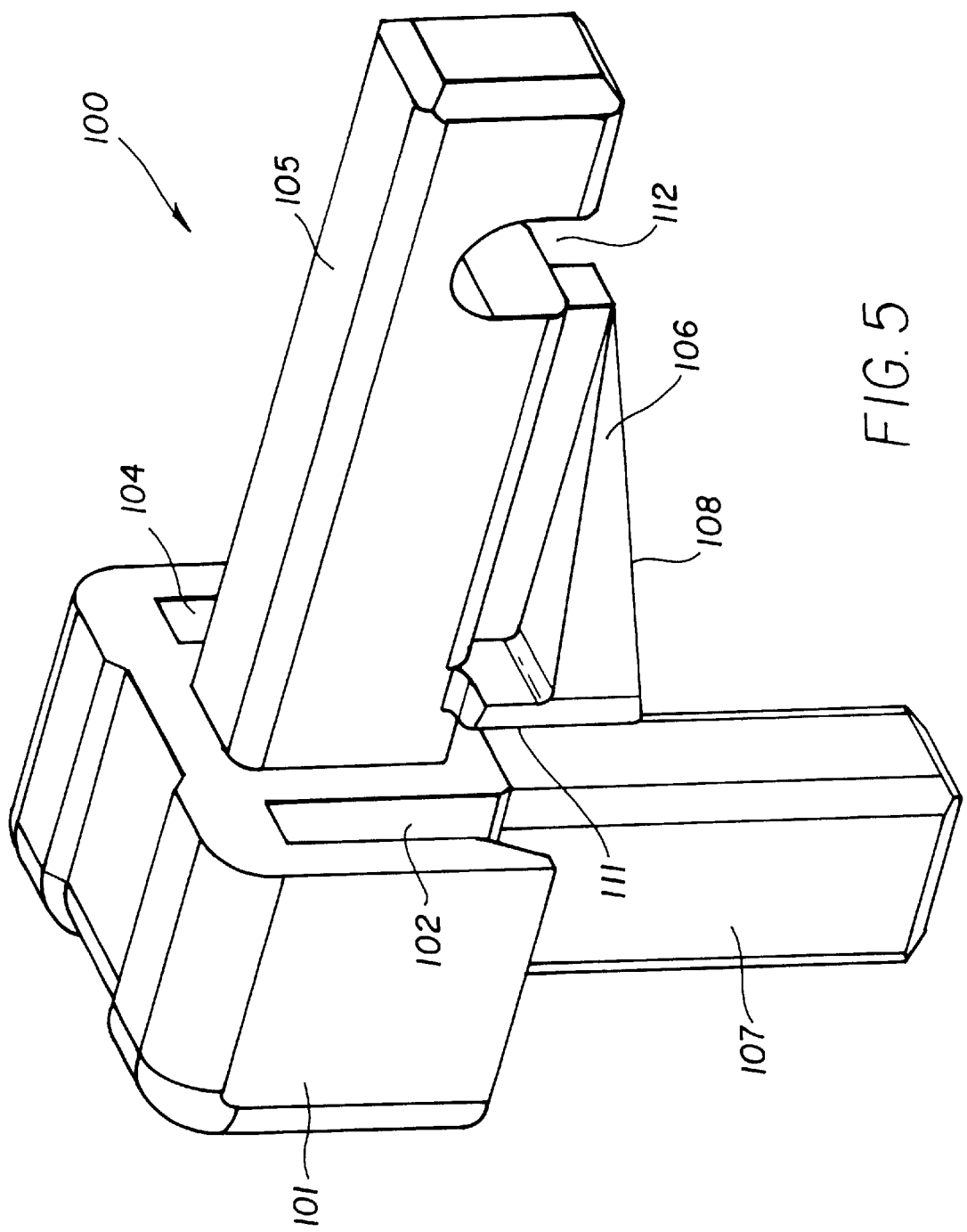
FIG. 5 shows another perspective view of the corner element of FIG. 4.
Figure 6:
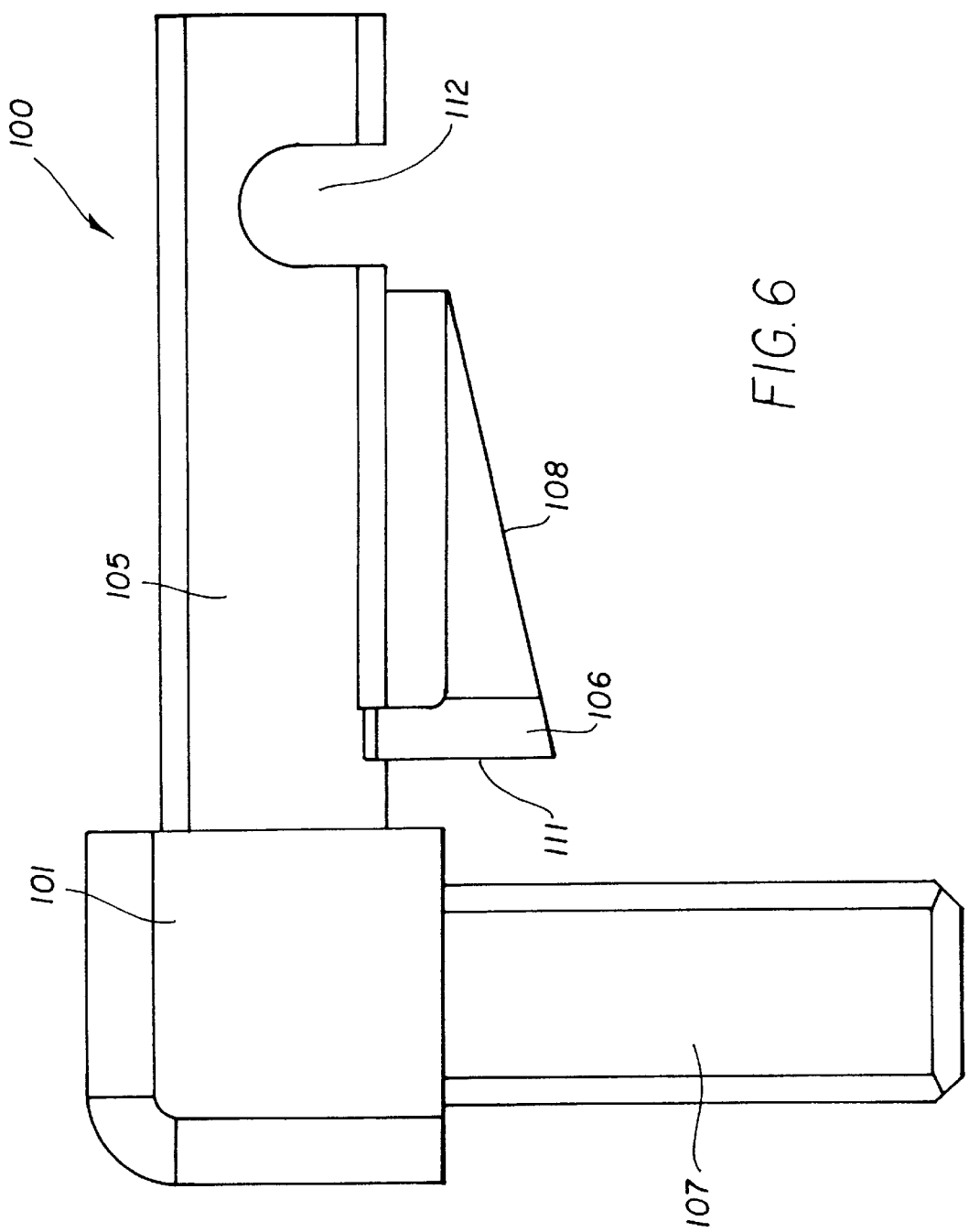
FIG. 6 shows a side view of the corner element of FIG. 4.
Figure 7:
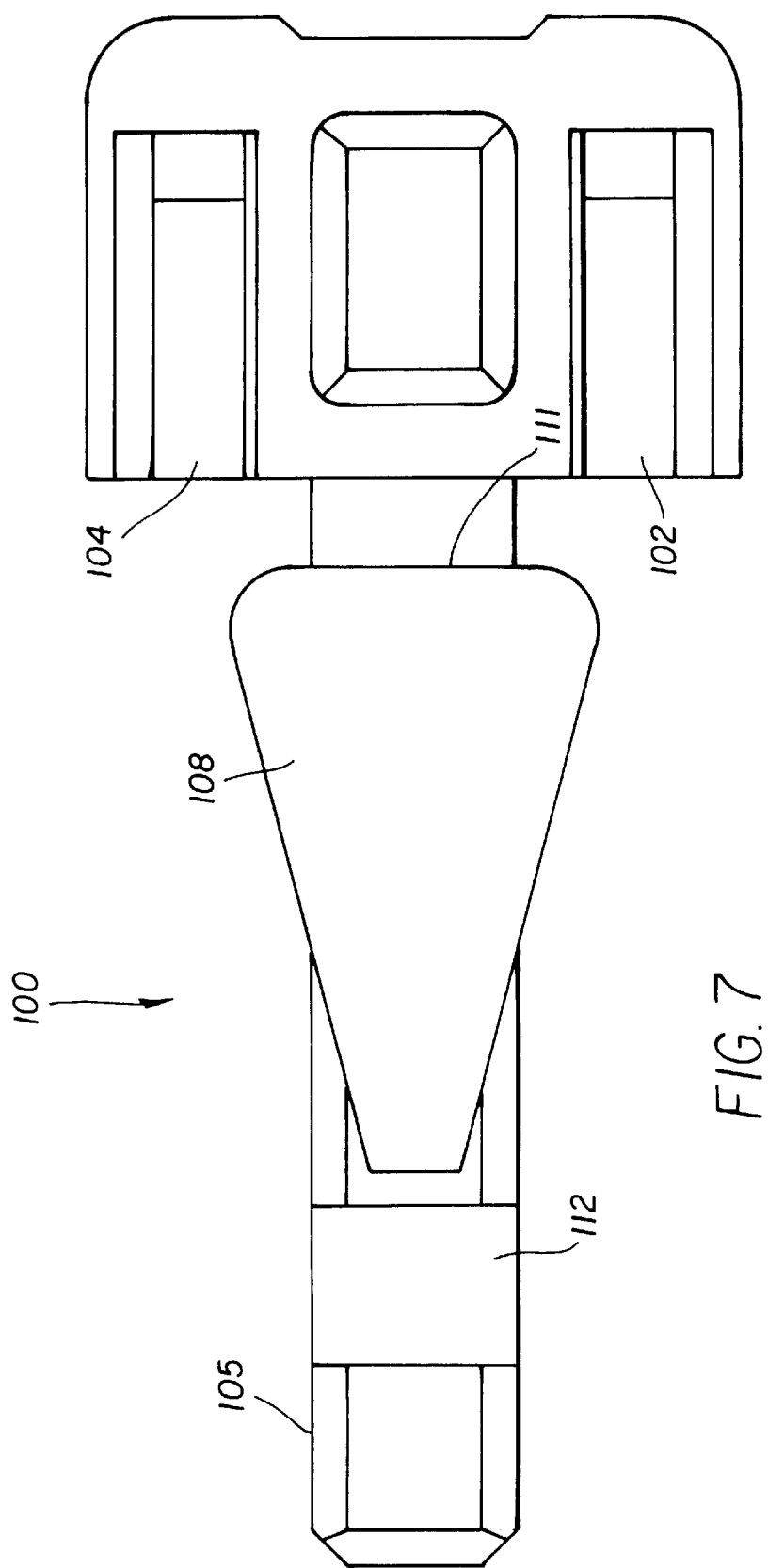
FIG. 7 shows a bottom view of the corner element of FIG. 4.

Upper corner channel 102 is adapted to receive a corner of upper panel 14. Lower corner channel 104 is adapted to receive a corner of lower panel 16. As best illustrated in FIGS. 4, 5, and 7, upper and lower corner channels 102,104 are configured as parallel slots so as to mate with upper and lower panels 14,16 which are configured as being parallel and planar.

First leg 105 is adapted to mate with either first side member 18 or second side member 20. Second leg 107 is adapted to mate with front end member 22. As illustrated in FIGS. 4–8, first and second leg 105,107 are configured to be inserted into members 22,18,20, though those skilled in the art may recognize other mating arrangements.

An inclined element 106 is integrally formed with first leg 105. As illustrated, incline element 106 is spaced from upper and lower corner channels 102,104. As shown, upper and lower channels 102,104 are parallel, and first leg 105 is perpendicular to second leg 107. Inclined element 106 includes a face 108 forming an acute angle relative to first leg 105, with the taper of inclined element 106 directed toward second leg 107. That is, inclined element 106 is tapered from a first end 109 to a second end 110, wherein the taper at second end 110 has a higher elevation. An acute angle in the range of between about 5 degrees to about 45 degrees has been found to be suitable.

Figure 8:
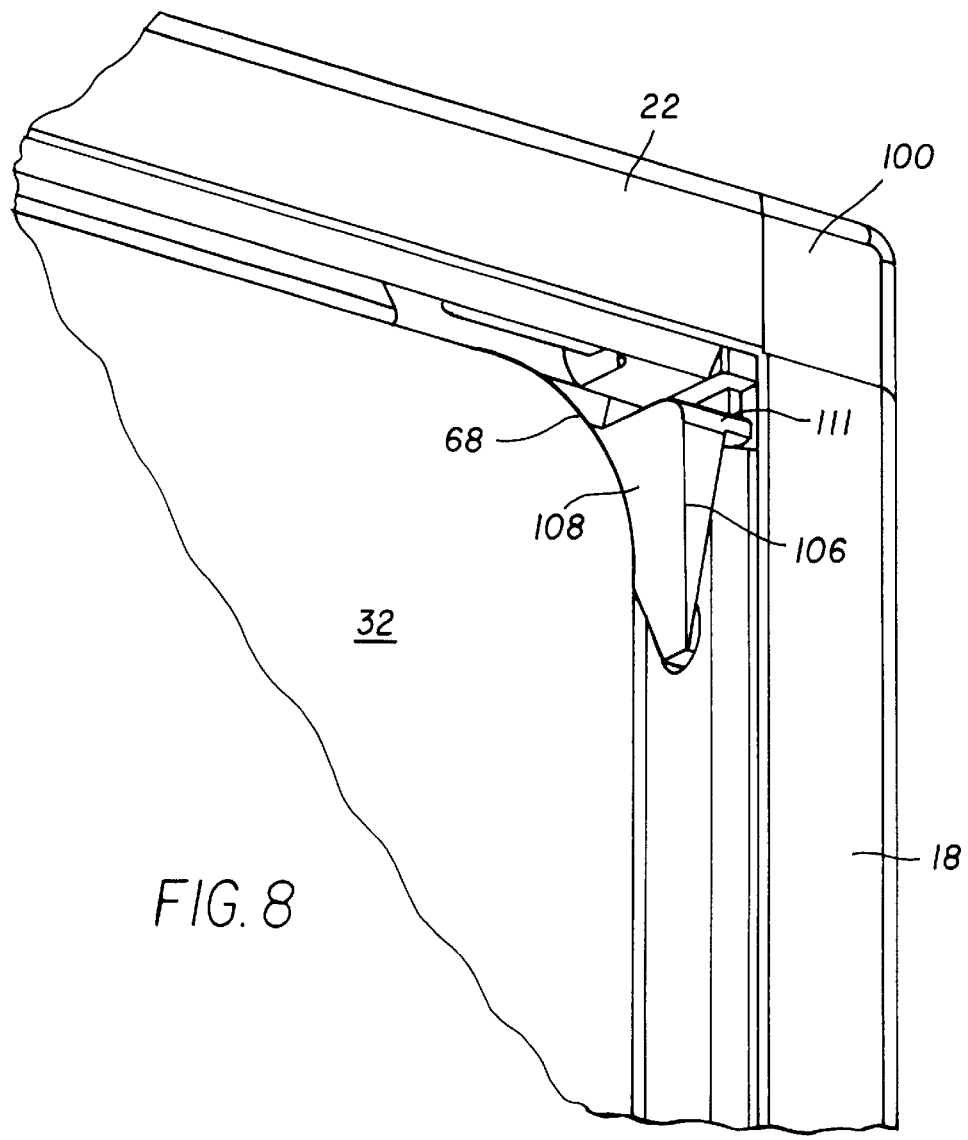
FIG. 8 shows a perspective view of the x-ray cassette with the upper panel removed to show the arrangement of the corner element relative to the storage phosphor assembly contained within the shell of the x-ray cassette.

When corner element 100 joins upper and lower panels 14,16 to define the cavity of shell 12 therebetween, inclined element 106 is configured to be disposed within the cavity of shell 12. This is best illustrated in FIG. 8. As such, when storage phosphor assembly 26 is contained within the cavity of shell 12, front corners 68,70 would be adjacent to inclined element 106 so that front corners 68,70 can abut inclined element 106 during insertion of storage phosphor assembly 26. As such, inclined element 106 acts as a guide portion for the insertion of storage phosphor 26 into shell 12, and further acts as a shock absorber for front corners 68,70. In addition, should cassette 10 be dropped or roughly handled, inclined element 106 provides a bumper or shock absorber for corner edges 68,70.

As shown in FIG. 4, face 108 of inclined element 106 at second end 110 preferably has a dimension D which is greater than a width W of first leg 105. Such a feature assists in the light integrity of cassette 10. That is, should there exist an opening at a butt joint, in the extrusion interface between members 18,20,22 with upper and lower panels 14,16, or in corner element 100, the increased dimension of face 108 will form a labyrinth, thereby assisting in the light-tightness of the cassette. Such a labyrinth is formed when corner element 100 seats securely with members 18,20,22.

Referring again to FIGS. 4–8, a light shielding member 111 disposed at second end 110 of inclined element 106 further assists in the light-tightness of cassette 10. When corner element 100 seats securely with members 18,20,22 within the cavity, light shielding member 111 abuts side member 18,20. The increased dimension of light shielding member 111 forms a labyrinth, thereby further assisting in the light-tightness of the cassette.

First leg 105 may optionally include a recess 112 to permit the mechanical fastening of the elements of the x-ray cassette, for example, first and/or second side members 18,20 to upper and/or lower panels 14,16.

Corner channel 100 may be comprised of an opaque thermoplastic material, thermosetting material, elastomeric material, thermoplastic elastomer, polymeric material, metal, or a composite material, including polypropylene or polyurethane. Preferably, the material comprising corner channel 100 is rigid yet provides for shock absorption should cassette 10 be dropped on its corner.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST

| | |
|---|---|
| 10 | cassette |
| 12 | shell |
| 14 | upper panel |
| 16 | lower panel |
| 18 | first side member |
| 20 | second side member |
| 22 | front end member |
| 24 | open end |
| 26 | storage phosphor assembly |
| 28 | back end member |
| 30 | insert plate |
| 32 | storage phosphor |
| 60, 62 | corner structures |
| 64, 66 | end portions |
| 68, 70 | front corners |
| 100 | corner element |
| 101 | corner portion |
| 102 | upper corner channel |
| 104 | lower corner channel |
| 105 | first leg |
| 106 | inclined element |
| 107 | second leg |
| 108 | face |
| 111 | light shielding member |
| 112 | recess |

What is claimed is:

1. A corner element for an x-ray cassette, the x-ray cassette having (i) an upper and lower panel, (ii) a first member joining the upper and lower panels to define a cavity therebetween, and (iii) a storage phosphor assembly adapted to be removably contained within the cavity, the corner element comprising:

an upper and lower corner channel for receiving, respectively, the upper and lower panels; and a first leg adapted to mate with the first member and having an inclined element integrally formed therewith, the storage phosphor assembly being disposed adjacent to the inclined element when contained within the cavity.

2. The corner element of claim 1, further comprising a second leg adapted to mate with a second member of the x-ray cassette, the second leg being perpendicular to the first leg.

3. The corner element of claim 1, wherein the upper and lower corner channels are parallel.

4. The corner element of claim 1, wherein the upper and lower corner channels are spaced from the inclined element.

5. The corner element of claim 1, wherein the inclined element forms an acute angle relative to the first leg.

6. The corner element of claim 1, further comprising a light shielding element disposed at one end of the inclined element.

7. A corner element for an x-ray cassette, the x-ray cassette having an upper and lower panel, a first and second side member, a front end member, and a storage phosphor assembly, the first and second side members and front end member joining the upper and lower panels to define a shell having a cavity and an opening, the storage phosphor assembly adapted to be removably contained within the cavity, the corner element comprising:

an upper and lower corner channel for receiving, respectively, the upper and lower panels; and a first leg adapted to mate with the first or second side member and having an inclined element integrally formed therewith for abutting the storage phosphor assembly when the storage phosphor assembly is contained within the cavity.

8. The corner element of claim 7, further comprising a second leg adapted to mate with the front end member.

9. The corner element of claim 8, wherein the first leg is perpendicular to the second leg.

10. The corner element of claim 7, wherein the upper and lower corner channels are parallel.

11. The corner element of claim 7, wherein the upper and lower corner channels are spaced from the inclined element.

12. The corner element of claim 7, wherein the inclined element has a tapered feature directed, from a narrow first width to a wider second width, toward the upper and lower corner channels.

13. The corner element of claim 7, wherein the inclined element forms an acute angle relative to the first leg.

14. The corner element of claim 7, wherein the inclined element is directed from the opening of the shell toward the front end member.

15. The corner element of claim 7, further comprising a light shielding member disposed at one end of the inclined element.

16. An x-ray cassette, comprising:

a shell having an upper and lower panel and a first member joining the upper and lower panels to define a cavity therebetween;

a storage phosphor assembly adapted to be removably contained within the cavity; and a first corner element disposed within the cavity comprising:

(a) an upper and lower corner channel for receiving, respectively, the upper and lower panels, the upper and lower channels being parallel; and (b) a first leg adapted to mate with the first member and having an inclined element integrally formed therewith, the storage phosphor assembly disposed adjacent to the inclined element when contained within the cavity.

17. The x-ray cassette of claim 16, the shell further comprising a front end member joining the upper and lower panels, the corner element further comprising a second leg adapted to mate with the front end member.

18. The x-ray cassette of claim 17, further comprising:

a second member joining the upper and lower panels to define the cavity therebetween; and a second corner element, comprising:

(a) an upper and lower corner channel for receiving, respectively, the upper and lower panels;

(b) a second leg adapted to mate with the front end member; and (c) a first leg adapted to mate with the second member and having an inclined element integrally formed therewith, the storage phosphor assembly disposed adjacent to the inclined element when contained within the cavity.

19. An x-ray cassette, comprising:

a shell comprising an upper and lower panel, a first and second side member, and a front end member, the first and second side members and front end member joining the upper and lower panels to define a cavity;

a storage phosphor assembly adapted to be removably contained within the cavity; and a first corner element comprising:
  (a) an upper and lower corner channel for receiving, respectively, the upper and lower panels, the upper corner channel being parallel to the lower corner channels;
  (b) a first leg adapted to mate with the first side member, the first leg having an inclined element integrally formed therewith which is disposed adjacent to the storage phosphor assembly when the storage phosphor assembly is contained within the cavity, the inclined element forming an acute angle relative to the first leg; and
  (c) a second leg adapted to mate with a front end member of the x-ray cassette, the second leg being perpendicular to the first leg.

20. The x-ray cassette of claim 19, further comprising a second corner element comprising:

(a) an upper and lower corner channel for receiving, respectively, the upper and lower panels, the upper corner channel being parallel to the lower corner channels;
  (b) a third leg adapted to mate with the second side member, the third leg having an inclined element integrally formed therewith which is disposed adjacent to the storage phosphor assembly when the storage phosphor assembly is contained within the cavity, the inclined element forming an acute angle relative to the third leg; and
  (c) a fourth leg adapted to mate with the front end member of the x-ray cassette, the fourth leg being perpendicular to the third leg.

\* \* \* \* \*